United States Patent [19]

Takeda et al.

[11] Patent Number: 4,982,584
[45] Date of Patent: Jan. 8, 1991

[54] STEERING LOCK SYSTEM

[75] Inventors: Yoshimitsu Takeda, Zama; Haruo Mochida, Kanagawa; Toshio Kanai, Ayase; Mikio Masaki, Tokyo, all of Japan

[73] Assignees: Nissan Motor Company, Ltd.; Kinzoku Kogyo Kabushiki Kaisha, both of Japan

[21] Appl. No.: 456,089

[22] Filed: Dec. 28, 1989

Related U.S. Application Data

[63] Continuation of Ser. No. 222,200, Jul. 21, 1988, abandoned.

[30] Foreign Application Priority Data

Jul. 21, 1987 [JP] Japan ................................ 62-182021

[51] Int. Cl.$^5$ ............................................. E05B 65/12
[52] U.S. Cl. ........................................ 70/252; 70/248; 70/255; 180/287
[58] Field of Search ................. 70/245, 248, 251, 252, 70/254, 255, 257; 180/271, 287

[56] References Cited

U.S. PATENT DOCUMENTS

| 3,490,255 | 1/1970 | Wight et al. | 70/239 X |
|---|---|---|---|
| 3,590,612 | 7/1971 | Henning | 70/251 X |
| 3,827,526 | 8/1974 | Smith | 70/255 X |
| 3,917,021 | 11/1975 | Williams et al. | 70/252 X |
| 3,940,958 | 3/1976 | Kuroki | 70/252 X |
| 4,218,717 | 8/1980 | Shuster | 361/79 |
| 4,232,571 | 11/1980 | Kimberlin | 70/252 X |
| 4,258,560 | 3/1981 | Jessop | 180/287 X |
| 4,270,624 | 6/1981 | Jessop | 70/252 X |

FOREIGN PATENT DOCUMENTS

| 2499005 | 8/1982 | France | 70/255 |
|---|---|---|---|
| 2499006 | 8/1982 | France | 70/255 |
| 164840 | 10/1982 | Japan . | |
| 164841 | 10/1982 | Japan . | |
| 2160485 | 12/1985 | United Kingdom | 70/248 |

Primary Examiner—Gary L. Smith
Assistant Examiner—Suzanne L. Dino
Attorney, Agent, or Firm—Lowe, Price, LeBlanc, Becker & Shur

[57] ABSTRACT

A steering lock system for locking a steering system of an automotive vehicle equipped with an automatic transmission. The steering lock system is comprised of a selector position sensor for detecting a selected position of a selector lever for the automatic transmission. The selector position sensor is adapted to produce a parking position signal when the selector lever is at a park position. A key cylinder is rotatable to take a LOCK position by an ignition key insertable into the key cylinder. The ignition key is enabled to be pulled out of the key cylinder at the LOCK position, upon which a steering shaft is locked. The ignition key is disabled from being pulled out of the key cylinder upon absence of the parking position signal from the selector position sensor while is enabled to be pulled out of the key cylinder only in response to the parking position signal from the selector position sensor, thereby improving reliability of operation of the steering lock system.

8 Claims, 6 Drawing Sheets

FIG. 5
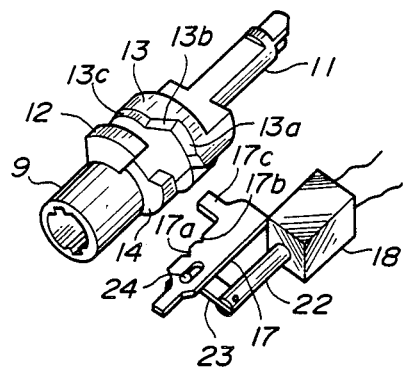
FIG. 6  FIG. 7
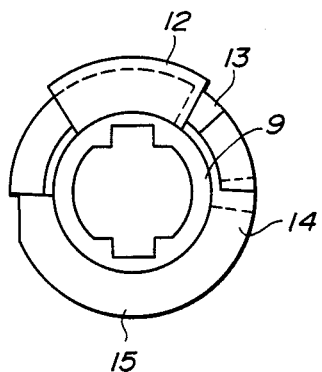 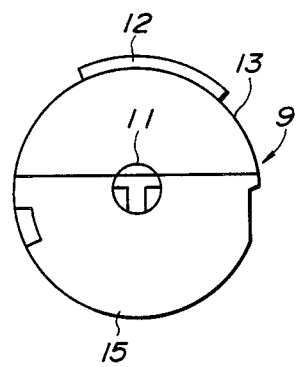

STEERING LOCK SYSTEM

This application is a continuation of Application Ser. No. 07/222,200 filed July 21, 1988 and now abandoned.

BACKGROUND OF THE INVENTION

1. Field of the Invention

This invention relates to improvements in a steering lock system for locking a steering mechanism, and more particularly to a steering lock system which operates only when a vehicle is in a parking condition.

2. Description of the Prior Art

Automotive vehicles are usually equipped with a steering lock system which is operated to lock a steering shaft of a steering mechanism when an ignition key is pulled out of a key cylinder after the key cylinder is rotated from an ACC (accessory) position to a LOCK (locking) position with an ignition key, thereby preventing the vehicle from burglary. In general, the key cylinder has an OFF position for switching OFF an electric system of the vehicle, positioned between the LOCK position and the ACC position. The ACC position is followed by an ON position for switching ON the ignition system of an engine and a START position for operating a starter motor and the like.

Such a steering lock system is arranged such that the ignition key is disabled from being pulled out of the key cylinder at the positions other than the LOCK position. However, if the key cylinder is carelessly rotated from the ACC position to the LOCK position, the ignition key may be pulled out of the key cylinder, which is not desirable from the viewpoint of safety.

In view of this, it has been proposed that the key cylinder is once restrained from rotation toward the LOCK position when the key cylinder comes from the ACC position to the OFF position; and the key cylinder cannot be rotated to the LOCK position unless such restraint is canceled upon operating a cancellation button, thus attaining safety. Such an arrangement is disclosed, for example, in Japanese Patent Provisional Publication No. 57-164841.

However, the above manner of cancellation is unreliable and troublesome, and therefore an improved cancellation arrangement is desirable.

SUMMARY OF THE INVENTION

It is an object of the present invention to provide an improved steering lock system which is arranged to enable an ignition key to be pulled out of a key cylinder only in response to a parking condition of a vehicle, thereby attaining safety of the steering lock system without troublesome operation.

The steering lock system according to the present invention is comprised of a selected position sensor for detecting a selected position of a shift lever. The selected position sensor is adapted to produce a parking position signal when the selected position corresponds to a parking condition of the vehicle. An ignition key is insertable into a key cylinder which is rotatable by the ignition key to a LOCK position. At the LOCK position, the ignition key is pulled out of the key cylinder. A locking mechanism is provided to lock a steering mechanism of the vehicle when the ignition key is pulled out of the key cylinder. A control device is provided to control operation of the ignition key relative to the key cylinder, in which the ignition key is enabled to be pulled out of the key cylinder only in response to the parking position signal from the selected position sensor, while the ignition key is disabled from being pulled out of the key cylinder in the absence of the parking position signal.

Accordingly, when the shift lever is operated to the parking position, the parking position signal is output from the selected position sensor, so that the ignition key is enabled to be pulled out of the key cylinder thereby to lock the steering mechanism. If the shift lever is out of the parking position, the ignition key cannot be pulled out of the key cylinder to thereby prevent locking of the steering mechanism. Thus, the steering lock system is improved in reliability and facilitated in operation as compared with conventional ones.

BRIEF DESCRIPTION OF THE DRAWINGS

FIG. 5 is an exploded perspective view of the key cylinder and a key cylinder rotation control device of the essential part of FIG. 1;

FIG. 6 is an axial view of the key cylinder of FIG. 5, as viewed from the front side;

FIG. 7 is an axial view of the key cylinder of FIG. 5, as viewed from the back side;

DETAILED DESCRIPTION OF THE INVENTION

Figure 8:
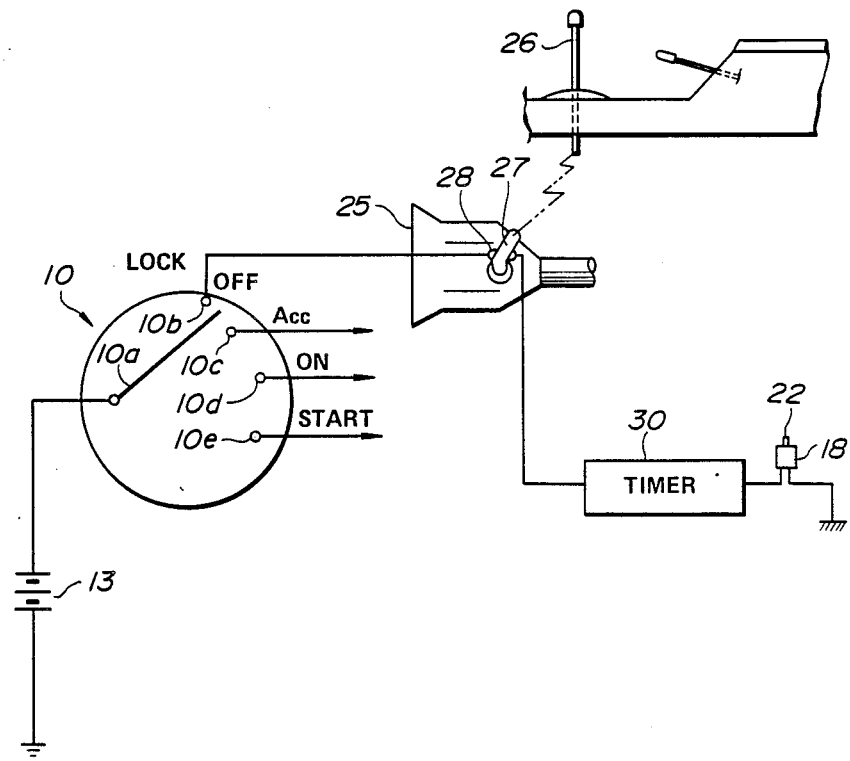
FIG. 8 is a wiring diagram of the steering lock system of the present invention.
Figure 9:
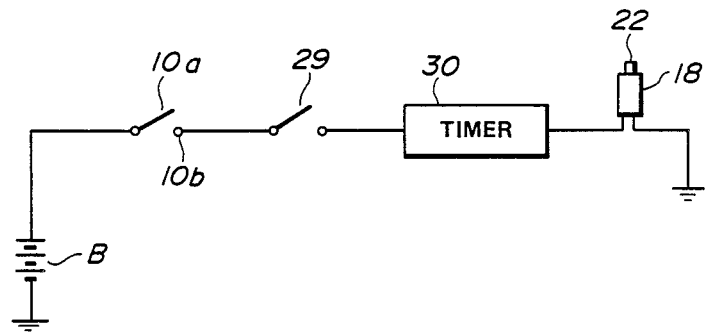
FIG. 9 is a wiring diagram of the essential part of the diagram of FIG. 8.
Figure 10:
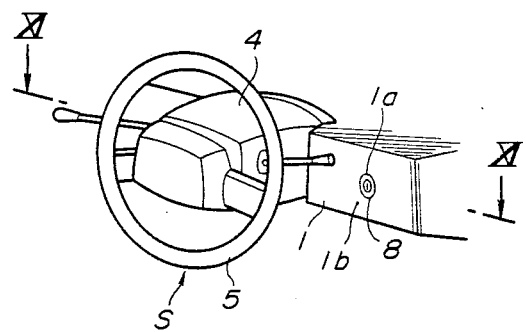
FIG. 10 is a perspective view of a part of the steering lock system of the present invention.
Figure 11:
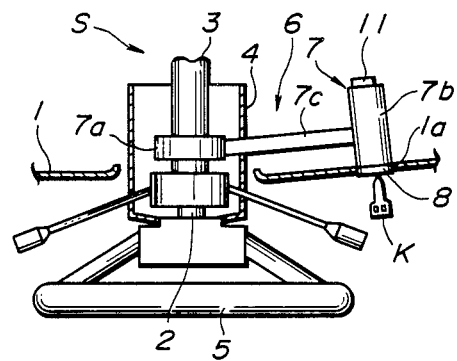
FIG. 11 is a sectional view taken in the direction of arrows substantially along the line XI—XI of FIG. 10.

Referring now to FIGS. 1 to 11, there is shown an embodiment of a steering lock system 6 for a vehicle, in accordance with the present invention. In this embodiment, the steering lock system is incorporated with a steering system or mechanism S of an automotive vehicle equipped with an automatic transmission 25 (See FIG. 8). As shown in FIGS. 10 and 11, the steering system includes a steering shaft 2 on which a steering wheel 5 is fixedly mounted. A column cover 4 is disposed around the steering shaft 3 and in an opening (no numeral) formed in an instrument panel 1. The instrument panel 1 is formed with a hole 1a for a key cylinder assembly 7.

Figure 1:
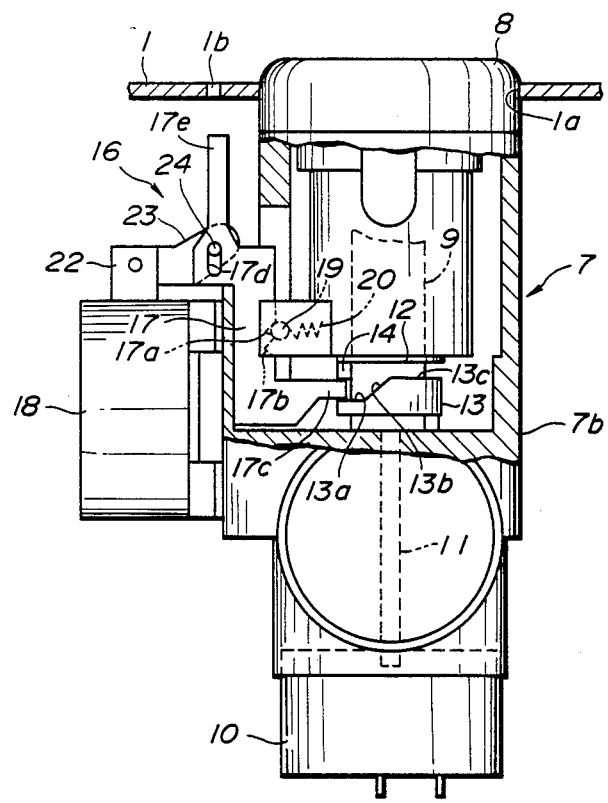
FIG. 1 is a plan view, partly in section, of an essential part of a steering lock system in accordance with the present invention.
Figure 2:
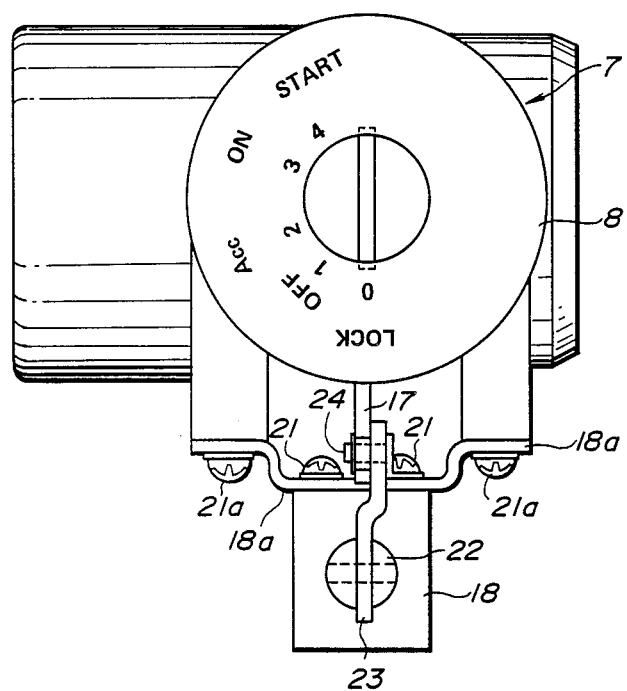
FIG. 2 is a front view of the essential part of FIG. 1.
Figure 3:
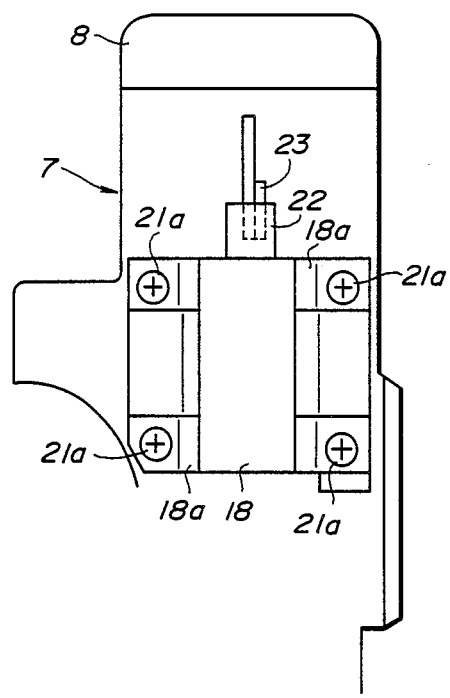
FIG. 3 is a bottom view of the essential part of FIG. 2.
Figure 4:
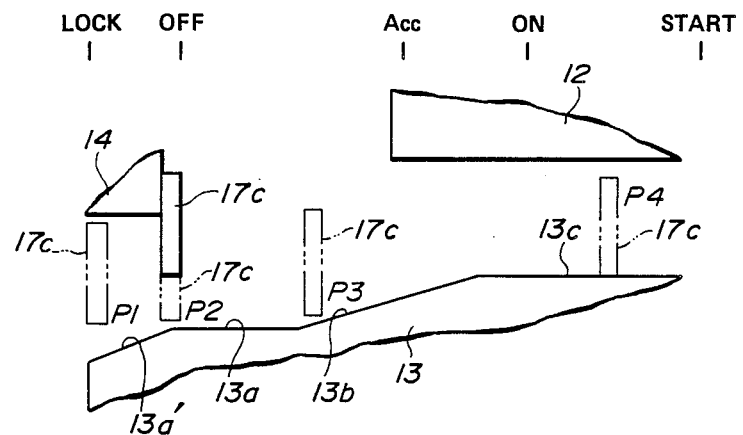
FIG. 4 is an explanatory view of the relationship between a cam of a key cylinder and an engagement projection of a control lever in the essential part of FIG. 1.

The steering lock system 6 includes the key cylinder assembly 7 which is connected through a cylindrical arm 7c with an installation section 7a. The installation section 7a is constructed of semicylindrical members which are fastened with each other and mounted on an end section of the steering column 3 so that the key cylinder assembly 7 is supported by the steering column 3. The key cylinder assembly 7 includes a cylindrical housing 7b disposed in the vicinity of the hole 1a and provided at its one end with a cap 8 which is fitted in the hole 1a as shown in FIG. 1 and 11.

A key cylinder 9 having a bottom wall is disposed within the cylindrical housing 7b and rotatable around the axis thereof. An ignition switch 10 is fittingly secured to the other end of the cylindrical housing 7b. The key cylinder 9 is integrally formed at its one end with a connecting shaft 11 which extends axially to engage with the ignition switch 10 in such a manner as to rotate a movable contact 10a (FIG. 8) of the ignition switch 10. The key cylinder 9 has a LOCK position, an OFF position, a ACC (accessory) position for passing electric current through accessories, an ON position for switching ON an engine ignition system, and a START position for switching ON an engine starter motor. When an ignition key K is inserted into the key cylinder 9 to rotate the key cylinder 9 in a direction of the order of the positions mentioned above, the movable contact 10a successively comes into contact with stationary contacts 10b, 10c, 10d, and 10e.

The key cylinder 9 is formed at its one end section outer peripheral surface with a rotor 12, a cam 13, a stopper projection 14 and another cam 15. As shown in FIGS. 1 and 4 to 7, the cam 13 has an inclined cam face 13a', horizontal cam faces 13a, 13c extending in the peripheral direction of the key cylinder 9, and another inclined cam face 13b. It is to be noted that the inclined cam faces 13a', 13b are inclined relative to a plane perpendicular to the axis of the key cylinder 9, while the horizontal cam faces 13a, 13c are parallel with the same plane. The horizontal cam face 13a is contiguous with the inclined cam face 13a'. The horizontal cam faces 13a, 13c are connected to each other through the inclined cam face 13b. The inclined cam face 13a'faces and is spaced from the stopper projection 14. The horizontal cam face 13c faces and is spaced from the rotor 12.

The outer periphery of the cam 15 is adapted to move a lock rod (not shown) forward and rearward relative to the steering shaft 2. This lock rod is adapted to come into engagement with a lock groove (not shown) of the steering shaft 2 to lock the steering shaft 2 when the ignition key K is pulled out of the key cylinder 9 at the LOCK position. When the key cylinder 9 is rotated from the LOCK position toward the ACC position upon inserting the ignition key K, the lock rod is pulled out of the lock groove of the steering shaft 2 under the action of the cam 15, thus canceling the lock condition of the steering shaft 2. Such a locking mechanism for the steering shaft 2 is disclosed, for example, in Japanese Patent Provisional Publication No. 57-164840. It will be understood that the locking mechanism may be replaced with other known mechanisms.

A key cylinder rotation control device 16 is incorporated with the cylindrical housing 7b and includes a control lever 17 which is supported by the cylindrical housing 7b in such a manner as to be movable in a direction parallel with the axis of the cylindrical housing 7b. Additionally, a solenoid 18 is provided to controllably drive the control lever 17. The control lever 17 is formed with two cutouts 17a, 17b for the purpose of locating the lever 17. The control lever 17 is formed at its one end section with an engagement projection 17c which can engage with the cam 13 and the stopper projection 14. The control lever 17 is formed at its intermediate section with an elongate opening 17d which extends in a direction parallel with the axis of the cylindrical housing 7b. The cylindrical housing 7b movably supports a ball 19 which is biased toward the control lever 17 by a spring 20 so that the ball 19 is engageable with one of the cutouts 17a, 17b. The cutouts 17a, 17b, the ball 19 and the spring 20 constitute a mechanism for locating the control lever 17.

The solenoid 18 is disposed so that its axis is parallel with that of the cylindrical housing 7b. The solenoid 18 is fixed to a plate 18a with small screws 21. The plate 18a is fixed to the cylindrical housing 7b with small screws (See FIGS. 2 and 3). An arm 23 is fixed at its one end section with an actuator rod 22 of the solenoid 18. A pin 24 is fixed to the other end section of the arm 23 and movably inserted in the elongate hole 17d. The solenoid 18 is so operated that the actuator rod 22 withdraws or moves downward in FIG. 1 when electric current is passed through the solenoid 18.

Referring to FIG. 8, the automatic transmission 25 is equipped with a range selecting lever 27 which is operated in relation to a shift lever or selector lever 26 for selecting vehicle operating and speed ranges. The automatic transmission 25 is provided with an inhibitor switch 28 which serves as a selector position sensor for sensing a selected position of the selector lever 26. The inhibitor switch 28 includes a switch 29 which is closed when the selector lever 26 is positioned at a Park (parking) position, as shown in FIG. 9. The switch 29, a timer 30, and the solenoid 18 are connected, in the mentioned order, in series with the stationary contact 10b (corresponding to the OFF position of the key cylinder 9) of the ignition switch 10. The timer 30 is adapted to be switched OFF upon lapse of a predetermined time (for example, several tens seconds) after electric current is initiated to be passed through the timer 30. The movable contact of the ignition switch 10 is connected to a battery B.

The manner of operation of the steering lock system of this embodiment will be discussed hereinafter.

When the key cylinder 9 is positioned at the LOCK position, the engagement projection 17c of the control lever 17 is positioned between the inclined cam face 13a'of the cam 13 and the stopper projection 14 as indicated by a position "P1". When the key cylinder 9 is rotated toward the START position from this position by the ignition key K, the engagement projection 17c of the control lever 17 is relatively moved in the direction of the instrument panel 1 or upwardly in FIG. 4 along the inclined cam face 13b as indicated by a position "P3" and thereafter relatively moved into between the horizontal cam face 13c of the cam 13 and the rotor 12 as indicated by a position "P4" in FIG. 4. At this position, the ball 19 shown in FIG. 1 engages with the cutout 17b so that the engagement projection 17c of the control lever 17 is maintained between the horizontal cam face 13c of the cam 13 and the rotor 12, thereby maintaining the engagement projection 17c in the peripheral direction of the stopper projection 14.

Upon rotational operation of the key cylinder 9 from the side of the START position to the side of the LOCK position by the ignition key K, when the key cylinder 9 with the ignition key K comes to the OFF position between the ACC position and the LOCK position, the engagement projection 17c of the control lever 17 is brought into contact with the side face of the stopper projection 14 as indicated by the position "P2" shown by solid lines, thus preventing the rotation of the key cylinder 9 toward the side of the LOCK position. At this time, the movable contact of the ignition switch 10 is brought into contact with the stationary contact 10b thereby establishing a condition in which electric current from the battery B passes through the solenoid 18.

In this state, when the selector lever 26 is moved to a Park (parking) position, the switch 29 in the inhibitor switch 28 is switched ON so that electric current from the battery B flows through the timer 30 to the solenoid 18. This energizes the solenoid 18 and therefore the actuator rod 22 withdraws in the solenoid 18. At this time, the arm 23 and the pin 24 move together with actuator rod 22 in the opposite direction of the instrument panel 1 or downward in FIG. 1, and therefore the engagement projection of the control lever 17 comes to between the inclined cam face 13a' and the stopper projection 14 as indicated by the position "P2" shown in phantom. This establishes a condition in which the key cylinder 9 is rotatable to the side of the LOCK position. In this position, the ball 19 shown in FIG. 1 is brought into engagement with the cutout 17a. Then the timer 30 is switched OFF upon lapse of a predetermined time after initiation of electric current passing through the timer 30.

While restraining the ignition key from being pulled out of the key cylinder has been shown and described as being accomplished by restraining the key cylinder from rotation in the above-mentioned embodiment, it will be understood that it may be accomplished by forming a notch, a hole or the like in the ignition key and by providing a member controllably engageable with the notch, the hole or the like only when the shift lever is operated to the Park position.

What is claimed is:

1. A steering lock system for a vehicle, comprising:
   a selected position sensor for electronically detecting a selected position of a shift lever, operatively connected to an automotive transmission of the vehicle said selected position sensor being adapted to produce a parking position signal when said selected position corresponds to a sensed parking condition for the automotive transmission of the vehicle;
   a key cylinder into which an ignition key is insertable in a first position of the key cylinder, said key cylinder being rotatable out of the first position to prevent said ignition key from being pulled out of said key cylinder; and
   means for locking a steering mechanism of the vehicle when said key is pulled out of said key cylinder; and
   means for controlling operation of said ignition key relative to said key cylinder, said controlling means including
      means for enabling said ignition key to be pulled out of said key cylinder only in response to said parking position signal from selected position sensor, and
      means for disabling said ignition key from being pulled out of said key cylinder upon absence of said parking position signal,
   wherein said enabling means includes means for enabling said key cylinder to rotate to said first position only in response to said parking position signal from said selected position sensor and wherein said disabling means includes means for disabling said key cylinder from rotation to said first position upon absence of said parking position signal, said key cylinder rotation disabling means including a control lever having a control lever engagement projection which is engageable with a key cylinder stopper projection integral with said key cylinder during rotation of said key cylinder toward said first position, upon absence of said parking position signal.

2. A steering locked system as claimed in claim 1, wherein said enabling means includes means for allowing said key cylinder to rotate during a predetermined time from a point of time of production of said parking position signal.

3. A steering lock system as claimed in claim 2, wherein said enabling means includes solenoid operated means for causing said control lever engagement projection to be disengageable with said stopper projection only in response to said parking position signal.

4. A steering lock system as claimed in claim 1, in which said disabling means includes cam means for establishing engagement of said control lever engagement projection with said key cylinder stopper projection at a second position of said key cylinder during rotation of said key cylinder toward said first position, said second position being slightly forward of said first position in a rotational direction toward said first position.

5. A steering lock system as claimed in claim 4, wherein said enabling disabling means includes solenoid operated means for releasing engagement of said control lever engagement projection with said key cylinder stopper projection at said second position of said key cylinder.

6. A steering lock system as claimed in claim 1, wherein said shift lever is a selector lever for an automatic transmission mounted on the vehicle.

7. A system for a vehicle, comprising:
   a selected position sensor for electronically detecting a selected position of a shift lever operatively connected to an automotive transmission of the vehicle, said selected position sensor being adapted to produce a parking position signal when said selected position corresponds to a sensed parking condition for the automotive transmission of the vehicle;
   a key cylinder into which an ignition key is insertable in a first position of the key cylinder, said key cylinder being rotatable out of the first position to prevent said ignition key from being pulled out of said key cylinder; and
   means for controlling operation of said ignition key relative to said key cylinder, said controlling means including
      means for enabling said ignition key to be pulled out of said key cylinder only in response to said parking position signal from said selected position sensor, and
      means for preventing said ignition key from being pulled out of said key cylinder upon absence of said parking position signal, said preventing means including a stopper projection integral with said key cylinder and solenoid operated means engageable with the stopper means to prevent withdrawal of the ignition key and to prevent rotation of the key cylinder from an "OFF" position to the first position in the absence of said parking position signal.

8. A system for a vehicle, comprising:
   a selected position sensor for electronically detecting a selected position of a shift lever operatively connected to an automotive transmission of the vehicle, said selected position sensor being adapted to produce a parking position signal when said selected position corresponds to a sensed parking condition for the automotive transmission of the vehicle;

a key cylinder into which an ignition key is insertable in a first position of the key cylinder, said key cylinder being rotatable out of the first position to prevent said ignition key from being pulled out of said key cylinder;

means for locking a steering mechanism of the vehicle when said key is pulled out of said key cylinder; and means for controlling operation of said ignition key relative to said key cylinder, said controlling means including means for enabling said ignition key to be pulled out of said key cylinder only in response to said parking position signal from said selected position sensor, and means for preventing said ignition key from being pulled out of said key cylinder upon absence of said parking position signal, said preventing means including a stopper projection integral with said key cylinder and solenoid operated means engageable with the stopper means to prevent withdrawal of the ignition key and to prevent rotation of the key cylinder from an "OFF" position to the first position in the absence of said parking position signal.

* * * * *